July 11, 1939.  E. W. HENRY  2,165,377
CHAIN HOLDING DEVICE
Filed Oct. 6, 1937
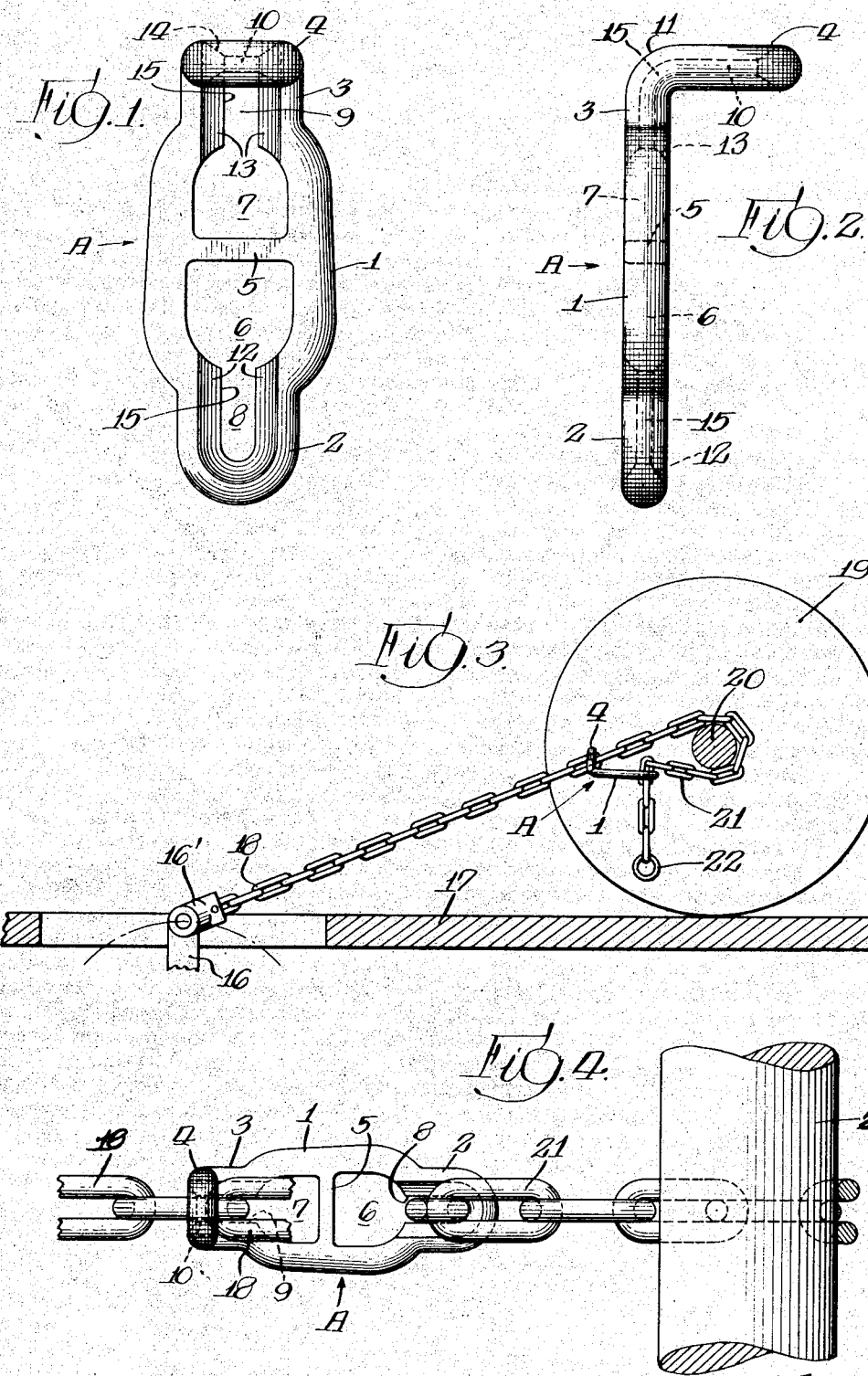
Inventor:
Ernest W. Henry.
By Charles L. Howard atty.

Patented July 11, 1939

2,165,377

UNITED STATES PATENT OFFICE 2,165,377

CHAIN HOLDING DEVICE

Ernest W. Henry, Battle Creek, Mich.

Application October 6, 1937, Serial No. 167,607

5 Claims. (Cl. 24—116)

My invention relates to a chain holding device the main object of which is to provide means for connecting two portions of a chain in such a manner as to prevent one portion of the chain from slipping relative to the other portion.

My invention may be employed whenever it is found necessary to hold an object by means of a chain where one end of the chain is fixed to a support and the loose portion of the chain is thrown over the object to be held and the loose portion is intended to be secured to the fixed portion.

In holding an object by means of a chain tie-down thrown over the object, it is obvious that if the loose portion of the chain slips relative to the fixed portion the chain fails to properly function. In the use of my invention this slippage is prevented and an object secured in place by chains employing my invention is rigidly held.

While my invention may be used for holding in place many types of objects through the medium of flexible tie-downs, I have shown in the drawing, for example, the invention applied to a flexible tie-down for holding a wheeled vehicle in a freight car, the invention being particularly adapted for assisting in securing automobiles on freight car floors or upon tilted decks in freight cars.

Other objects and advantages will appear from the following more detailed description, and it will be understood that various changes and modifications may be made in the device as shown in the figures without departing from the spirit of this invention and that the same are submitted for illustrative purposes only and not in a limiting sense, the scope of the invention being defined in the appended claims.

In the accompanying drawing in which like numerals and letters of reference indicate similar parts throughout the several views:

Figure 1 is a top plan view of my holding device,

Figure 2 is a side elevation,

Figure 3 is a side view of a chain tie-down thrown over the axle of wheel with one end secured adjacent a car floor and with the holding device in proper position.

Figure 4 is a top plan view of a portion of an axle, chain tie-down and my holding device.

Referring to the drawing, A represents the holding device as a whole which may be considered a continuous elongated loop. 1 is the main central body of the loop, 2 a narrowed portion of the loop and 3 an oppositely narrowed portion of the loop. 4 represents a continuation of portion 3 disposed at substantially a right angle thereto and 5 is a bridge member for the main central portion of the loop 1. 6 is an opening on one side of the bridge 5, and 7 is a smaller opening on the other side of the bridge. 8 is a slot extending from opening 6 into the narrowed portion 2 and 9 a slot extending from opening 7 into oppositely disposed narrow portion 3. 10 represents a slot in the angular portion 4, which slot is a continuation of slot 9. 11 represents the bend connecting the portions 3 and 4. 12 is a bevel or taper for slot 8, 13 is a bevel or taper for slot 9 and 14 a bevel or taper for slot 10, it being understood that these bevels are on both sides of the slots to leave between the bevels a portion of metal 15 to afford sufficient strength. 16 is a tie-down lever and pivoted thereto is a chain anchor 16'. 17 represents the floor of the car, 18 the fixed end of a flexible tie-down, 19 a vehicle wheel and 20 the axle for the wheel. 21 represents a loose end portion of the chain and 22 a link attached to the extremity of the loose portion of the chain.

Assuming that one end of the tie-down chain is attached to a lashing drum, take-up cam, or tension member 16 as shown by the drawing, and the loose portion of the chain portion 21 is to be thrown over the object to be secured, such as an axle 20 of a wheeled vehicle: In order to rigidly support the wheeled vehicle upon the floor 17, for instance, it is necessary that portion 21 of the chain be firmly held to portion 18 and prevented from slipping before tension lever 16 is operated. To accomplish this the chain is first threaded through opening 7 and the link 22 forged to its extremity, the link being of such diameter as to prevent its withdrawal through opening 7. From this it will be seen that accidental withdrawal of the holding device from the chain is prevented and that the device is always on the chain tie-down ready for service. The loose end 21 of the chain is then thrown over the axle and the chain pulled taut. The holding device is then slid up upon the chain within a short distance of the axle, or any other proper position, a vertical link of the chain passing from opening 7 to slot 9 and thence to slot 10 of the angular portion 4. It will be seen that in this position the device is prevented from moving up or down upon the chain. The free end of the device is permitted to fall and then the end 21 of the chain is passed through the opening 6, large enough for the reception of link 22. The portion 21 of the chain is then pulled taut through opening 6 and a link of the chain slid into the slot 8. From this it will be seen that the device cannot slip upon the chain and that when tension lever 16 is operated to give the final tautness to the chain, the lower end of the chain cannot slip with respect to the other portion of the chain.

Bevels 12, 13 and 14 on opposite sides of the slots 8, 9 and 10 are for the purpose of providing bearing surfaces for the end of the links adjacent the links which occupies the slots when the hold-down device is functioning. Also these bevels permit the use of a close-link chain.

What we desire to secure and protect by Letters Patent of the United States is:

1. A tie-down device comprising a chain, a loop associated therewith having a central widened portion and narrow end portions, one of said narrow portions being elongated and disposed at substantially a right angle to the main body of said loop, a bridge piece connecting the central widened portion providing openings of unequal size on opposite sides of said bridge piece, each of said narrow end portions of said loop defining a slot and an enlarged link located at the end of said chain of such diameter to permit its insertion through the larger opening on one side of said bridge piece but of such diameter as to prevent its insertion through the smaller opening on the other side of said bridge piece.

2. A tie-down device comprising a chain, a loop associated therewith having a central widened portion and narrow end portions, one of said narrow portions being elongated and disposed at substantially a right angle to the main body of said loop, a bridge piece connecting the central widened portion providing openings on opposite sides of said bridge piece, each of said narrow end portions of said loop defining a slot communicating with the central widened portion, the one on the side of the bridge piece adjacent the narrow portion having the angular portion being smaller than the opening on the other side of the bridge piece and an enlarged link located at the end of said chain of such diameter as to permit its insertion through the larger opening on one side of said bridge piece but of such a diameter as to prevent its insertion through the smaller opening on the other side of said bridge piece.

3. A tie-down device comprising a chain, a loop associated therewith having a central widened portion and narrow end portions, one of said narrow portions being elongated and disposed at substantially a right angle to the main body of said loop, a bridge piece connecting the central widened portion providing openings of unequal size on opposite sides of said bridge piece, each opening communicating with a slot defined by the narrow end portions of the loop, the edges of each slot being beveled on opposite sides and an enlarged link located at the end of said chain of such diameter as to permit its insertion through the larger openings on one side of said bridge piece but of such diameter as to prevent its insertion through the smaller opening on the other side of said bridge piece.

4. A tie-down device comprising a chain, a loop associated therewith having a central widened portion and narrow end portions, one of said narrow portions being elongated and disposed at substantially a right angle to the main body of said loop, a bridge piece connecting the central widened portion providing openings on opposite sides of said bridge piece, each of the narrow end portions having beveled walls on opposite sides of the opening defined by the loop, the opening on the side of the bridge piece adjacent the narrow portion having the angular portion being smaller than the opening on the other side of the bridge piece and an enlarged link located at the end of said chain of such diameter as to permit its insertion through the larger opening on one side of said bridge piece but of such diameter as to prevent its insertion through the smaller opening on the other side of said bridge piece.

5. A tie-down device comprising a chain, a loop associated therewith having a central widened portion and narrow end portions, one of said narrow end portions being disposed at an angle to the main body of the loop, a bridge piece connecting the central widened portion which provides an opening of unequal size on each side of the bridge piece, the central opening adjacent the narrow portion disposed at an angle being smaller than the central opening on the other side of said bridge piece and an enlarged link located at the end of said chain of such diameter as to permit its insertion through the larger opening on one side of said bridge piece but of such diameter as to prevent its insertion through the smaller opening on the other side of said bridge piece.

ERNEST W. HENRY.